United States Patent
Diehl et al.

(10) Patent No.: US 11,221,627 B2
(45) Date of Patent: Jan. 11, 2022

(54) DIRECTED INTERACTION OF CUSTOMERS WITH AUTONOMOUS VEHICLES

(71) Applicant: Pony.ai, Inc., Fremont, CA (US)

(72) Inventors: Peter G. Diehl, Shanghai (CN); Cheng Jin, Fremont, CA (US)

(73) Assignee: Pony AI Inc., Grand Cayman (KY)

( * ) Notice: Subject to any disclaimer, the term of this patent is extended or adjusted under 35 U.S.C. 154(b) by 234 days.

(21) Appl. No.: 16/297,506

(22) Filed: Mar. 8, 2019

(65) Prior Publication Data

US 2020/0285240 A1  Sep. 10, 2020

(51) Int. Cl.
*G05D 1/02* (2020.01)
*G06F 21/35* (2013.01)
*G06Q 50/30* (2012.01)
*G05D 1/00* (2006.01)
*G06F 21/32* (2013.01)

(52) U.S. Cl.
CPC ......... *G05D 1/0212* (2013.01); *G05D 1/0088* (2013.01); *G05D 1/0276* (2013.01); *G06F 21/32* (2013.01); *G06F 21/35* (2013.01); *G06Q 50/30* (2013.01); *G05D 2201/0213* (2013.01)

(58) Field of Classification Search
CPC ............... G05D 1/0212; G05D 1/0276; G05D 2201/0213; G05D 1/0088; G06F 21/35; G06F 21/32; G06F 2221/2111; G06Q 50/30
See application file for complete search history.

(56) References Cited

U.S. PATENT DOCUMENTS

| | | | |
|---|---|---|---|
| 9,377,315 B2 * | 6/2016 | Grover | G01C 21/34 |
| 9,836,057 B2 * | 12/2017 | Fairfield | G08G 1/202 |
| 9,881,503 B1 * | 1/2018 | Goldman-Shenhar | G05D 1/0088 |
| 9,897,417 B2 * | 2/2018 | Tebay | F41G 3/08 |
| 9,928,734 B2 * | 3/2018 | Newman | G08G 1/005 |
| 10,074,128 B2 | 9/2018 | Colson et al. | |
| 10,203,691 B2 * | 2/2019 | Tebay | G08G 5/0069 |
| 10,289,922 B1 * | 5/2019 | Wengreen | G08G 1/202 |
| 10,580,291 B1 * | 3/2020 | Rothenberg | G08G 1/005 |
| 10,843,622 B2 * | 11/2020 | Lee | G06K 9/00362 |
| 2016/0161266 A1 * | 6/2016 | Crawford | G06Q 10/047 701/25 |
| 2017/0153714 A1 * | 6/2017 | Gao | G06K 9/00798 |
| 2017/0344010 A1 * | 11/2017 | Rander | G05D 1/0022 |
| 2018/0033310 A1 | 2/2018 | Kentley-Klay et al. | |
| 2018/0053412 A1 * | 2/2018 | Lagnemma | G08G 1/202 |
| 2018/0174460 A1 * | 6/2018 | Jung | B60Q 1/525 |
| 2018/0364696 A1 * | 12/2018 | Lavoie | B60W 30/06 |
| 2019/0066003 A1 * | 2/2019 | Dyer | G01C 21/26 |
| 2019/0197325 A1 * | 6/2019 | Reiley | G08B 21/24 |
| 2019/0318306 A1 * | 10/2019 | Mere | G06Q 10/0832 |
| 2019/0359128 A1 * | 11/2019 | Harper | B60Q 5/008 |
| 2020/0043063 A1 * | 2/2020 | London | G06Q 30/0281 |
| 2020/0202142 A1 * | 6/2020 | To | G05D 1/0088 |

(Continued)

*Primary Examiner* — Dale W Hilgendorf
*Assistant Examiner* — Alexander C. Bost
(74) *Attorney, Agent, or Firm* — Sheppard Mullin Richter & Hampton LLP

(57) ABSTRACT

A system included and a computer-implemented method performed in an autonomous-driving vehicle are described. The system performs: receive a request to meet a person at a location; drive the vehicle to the location; identify the person at the location; and providing an instruction for the person to interact with the vehicle.

19 Claims, 7 Drawing Sheets

(56) References Cited

U.S. PATENT DOCUMENTS

2020/0272143 A1* 8/2020 Scott .................... G05D 1/0016
2020/0310461 A1* 10/2020 Kaufman ............. G05D 1/0088

* cited by examiner

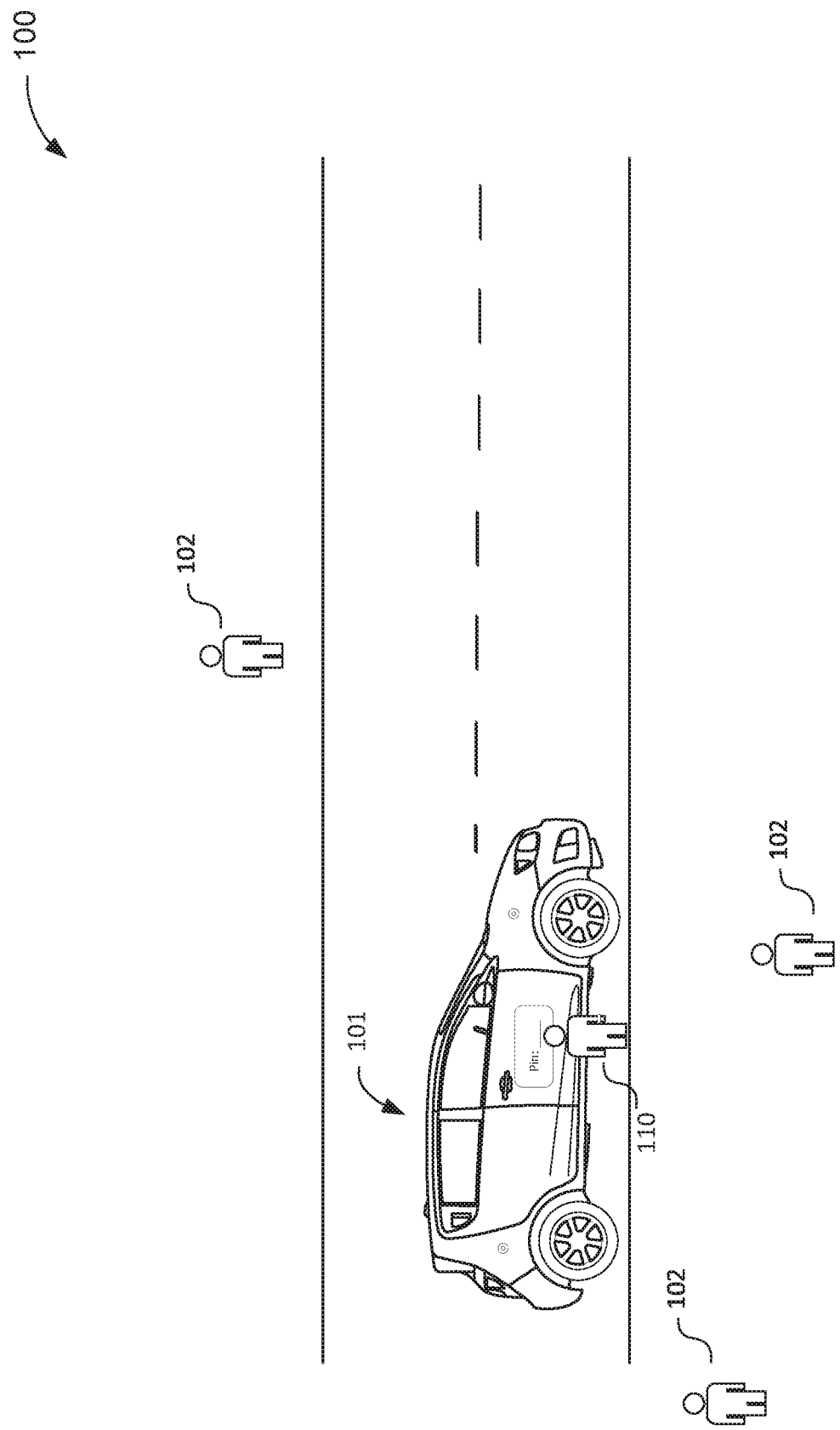

DIRECTED INTERACTION OF CUSTOMERS WITH AUTONOMOUS VEHICLES

BACKGROUND

Autonomous-driving vehicles are gradually replacing vehicles and other services operated by people. For instance, a fully autonomous taxi will not require a taxi driver. Likewise, a fully autonomous delivery vehicle will not require a delivery person to hand an article to a customer. Human operators can communicate with other humans (e.g., customers) via different means depending on the specific needs or environmental factors. For instance, if a customer is blind, a human operator may use voice means to communicate with the blind customer. If the environment is too loud, a human operator may use gestures or screen to exchange information.

An autonomous-driving vehicle, however, can have difficulties to adapt to different needs. Presently, autonomous-driving vehicles being tested rely heavy on communicating to handheld devices such as a smartphone. A smartphone, however, may not be as intuitive or convenient in certain situations. For instance, when a customer is notified that an autonomous-driving taxi is arriving, the customer may have difficulty identifying the correct one if multiple similarly-looking vehicles are approaching. It can be even more difficult when the customer has impaired communication capacity, such as being blind.

These and other issues are addressed, resolved, and/or reduced using techniques described herein. The foregoing examples of the related art and limitations related therewith are intended to be illustrative and not exclusive. Other limitations of the related art will become apparent to those of skill in the relevant art upon a reading of the specification and a study of the drawings.

SUMMARY

Described herein are a system included in and a computer-implemented method performed in an autonomous-driving vehicle. The system includes one or more processors; and a memory storing instructions that, when executed by the one or more processors, receive a request to meet a person at a location; drive the vehicle to the location; identify the person at the location; and providing an instruction for the person to interact with the vehicle.

In some embodiments, the instruction comprises a request for the person to authenticate as the one in the request. In some embodiments, the request comprises showing of a gesture. In some embodiments, the request comprises presenting a portion of the body of the person in front of a sensor. In some embodiments, the portion comprises a face, an eye, or a side of the body. In some embodiments, the request comprises speaking or typing a code provided to the person wirelessly.

In some embodiments, the instructions further cause the processor to authenticate the person by confirming co-location of the person and a handheld device in wireless communication with the vehicle.

In some embodiments, the instructions further cause the processor to provide a second instruction for the person to pick up an item in the vehicle. In some embodiments, the second instruction is displayed or spoken. In some embodiments, the instructions further cause the processor to monitoring items in the vehicle during the pickup. In some embodiments, the instructions further cause the processor to rearrange items to facilitate pickup.

In some embodiments, the directed alert notification is personalized to the person. The personalization, for instance, can be based on a code provided to the person wirelessly in advance, or based on a user preference or language choice of the person.

In some embodiments, the instructions further cause the processor to rearrange remaining items after the pickup. In some embodiments, the instructions further cause the processor to receive a confirmation from the person that the pickup is complete.

In some embodiments, the instructions further cause the processor to, following identification of the person, send a directed alert notification to the person, wherein the directed alert notification comprises a directed acoustic signal. In some embodiments, the directed acoustic signal is sent from at least two different sound generating devices (e.g., speakers) disposed on the vehicle. In some embodiments, at least one of the speakers is disposed at the front of the vehicle and another at the rear of the vehicle. In some embodiments, the acoustic signal from each speaker is synchronized so as to arrive at the person at the same time.

In some embodiments, the directed alert notification comprises a spoken or displayed instruction to notify the person the arrival of the vehicle.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIG. 1A-C illustrate situations where the present technology is applicable.

DETAILED DESCRIPTION

Figure 1A:
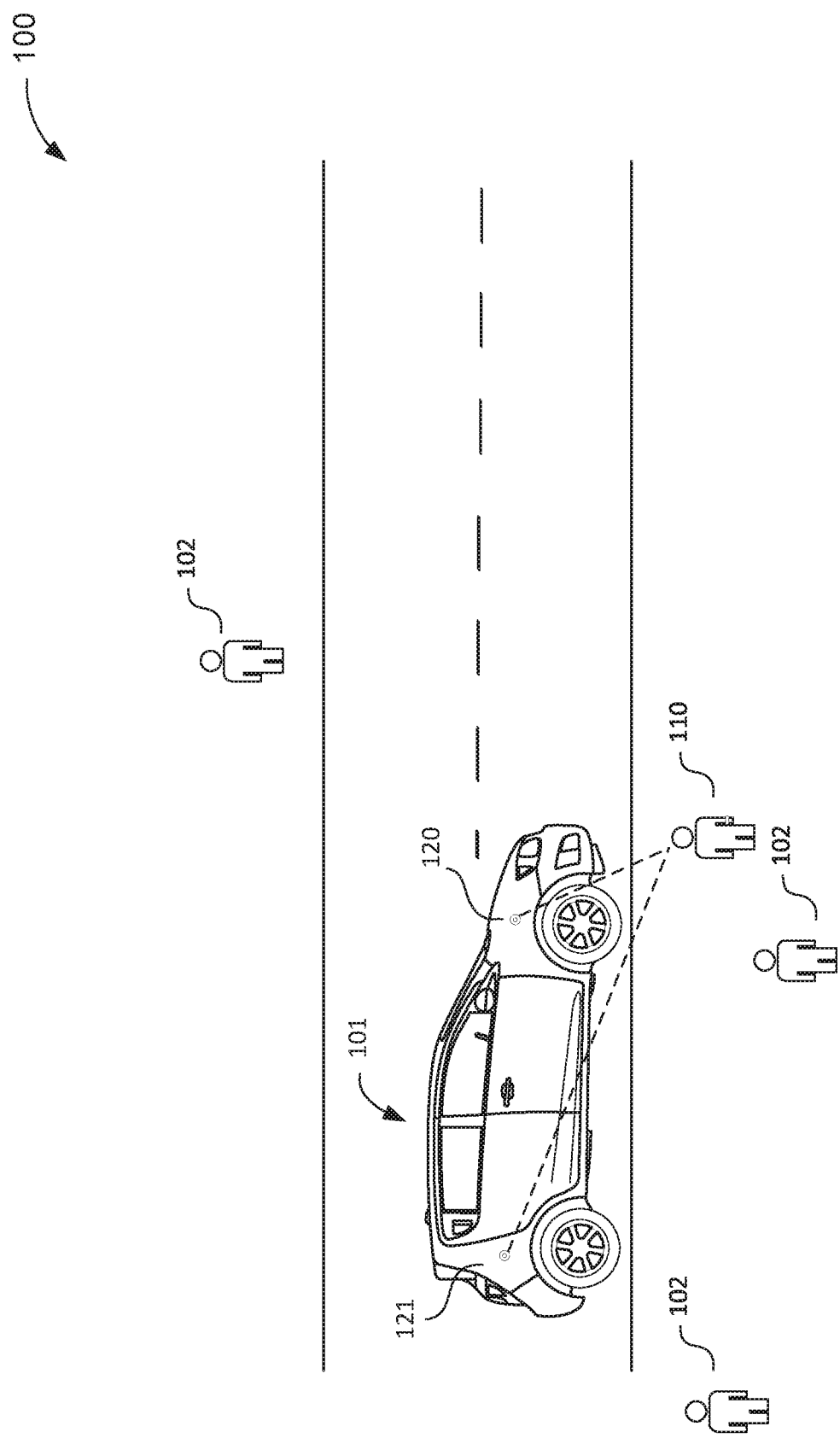

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise.

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

Various embodiments described herein are directed to a system included in an autonomous-driving vehicle (or simply autonomous vehicle) and a computer-implemented method performed in an autonomous-driving vehicle. In a specific implementation, the system and the computer-implemented method are intended to provide directed notifications and communications with a subject that the autonomous vehicle identifies as a target for communication. The directed alert notification preferably includes an acoustic signal, but can also include other signals such as a visual signal. Once the notification succeeds in attracting the attention by the target subject, the autonomous vehicle can then initiate an interactive communication with the target subject.

A directed acoustic signal, or directed sound or focused sound, refers to an acoustic signal(s) transmitted from at least two sound sources that are preferentially directed to a target location and spreads less than conventional speakers.

In some implementations, prior to providing such a directed alert notification, the autonomous vehicle identifies the target subject through various different approaches. Once the directed alert notification receives the subject's attention, the autonomous vehicle can then engage in interactive action with the subject, such as confirming the subject's interest in using the autonomous vehicle, authenticating the subject, and allowing the subject to open and use the vehicle.

Such a technology can find uses in many areas. For instance, when an autonomous taxi is to pick up a passenger, after identifying the passenger, sometimes from a crowd, the autonomous taxi sends a directed alert notification to alert the passenger that the taxi is ready for boarding. By using the directed alert notification, the other persons nearby would not be bothered. On the one hand, this technology can help reduce the overall noise level to people who do not need to hear the alert. On the other hand, the directed alert notification can be louder than traditional alerts so that the passenger would not have trouble identifying it. This is particularly useful for people with reduced vision or blindness. It can also be quite useful for people that tend to be distracted easily.

While the directed alert notification provides an effective and relatively private means to reach out to the passenger. The content of such communication may be limited in scope. The subsequent interaction, therefore, presents an opportunity for broadened exchange of information. For instance, the alert notification can ask the passenger to move closer to the front passenger door of the vehicle, and guide the move with the directed voice if the passenger is blind. Once the passenger is close, a different speaker that is close to the passenger can continue the conversation at a higher privacy level. Certain sensors on the vehicle will be then able to authenticate the passenger, such as checking a gesture, the body contour, the voice, or the iris.

Another example use of this technology, in the context of autonomous delivery, is to notify a customer of the arrival of a delivery. When the autonomous vehicle arrives at the location and identifies the customer, the vehicle can alert the customer who can then authenticate herself or himself and retrieve the delivery through the interactive system.

Yet another example use of this technology is to direct traffic. For instance, if a person blocks the way to an autonomous vehicle, after identifying the situation and the person, the vehicle may send a directed alert to signal the person to leave. If the person fails to leave, the vehicle can then engage in an interaction to understand the situation, and take actions accordingly.

Still another example is to make pedestrians or other individuals around an autonomous vehicle aware of the driving decision of the autonomous vehicle. For instance, when an autonomous vehicle attempts to make a right turn at an intersection, the autonomous vehicle may send a directed alert notification to pedestrians on the right to safely proceed to cross the street while it is waiting. To another vehicle, the autonomous vehicle may signal that it has priority to proceed first to avoid clash. Such interactions can provide other road users the comfort that they can safely share the road with autonomous vehicles.

Certain initial steps of one embodiment of the presently disclosed methods are illustrated as scenario 100 in FIG. 1A. An autonomous vehicle 101 receives a request to pick up a passenger 110. The request may be received wirelessly by a computer in the vehicle, via a server, from a user. The user may be passenger 110, or another person, or based on a pre-scheduled command. The vehicle arrives at the approximate location, slows down, and starts to locate the passenger.

In FIG. 1A, at the time the vehicle slows down or stops, besides passenger 110, there are also three other persons 102 close by. A variety of methods can be used for the autonomous vehicle to identify the correct passenger. For instance, if the persons are relatively spread out, the GPS location provided by a device accompanying passenger 110 may be sufficient to identify the passenger.

In some embodiments, the vehicle keeps occasional communication with the device of the passenger, which provides up-to-date GPS location of the passenger to the vehicle. The vehicle is also equipped with a GPS system, along with sensors, such as LiDAR, radar and camera, that detect the location of a person relative to the vehicle. With the GPS location of the vehicle, the GPS location of the device, and the relative location of each persons around the vehicle, the vehicle will be able to determine which person is most likely the one holding the device and is thus the passenger.

In another example, while the vehicle is approaching, the vehicle may send a wireless signal to a device held by the passenger which, in response, will then start to transmit certain signals to the vehicle for verification. The signals may be visual signals, e.g., flash lights. The signal can also be wireless signals such as a Bluetooth signal, a near field communication (NFC) signal, an infrared signal, a WiFi signal, or the like.

Different modes of communication can be used between the autonomous vehicle and the handheld device, so long as it is sufficient for the autonomous vehicle to confirm the identity of the passenger. For instance, while the autonomous vehicle is approaching, it can request that the handheld device emits an infrared signal, or a cluster of infrared signals at a certain frequency or pattern. Upon detection of the expected signal, the vehicle can determine the location of the handheld device.

Another method entails a signal transmitter embodied in a handheld device accompanied by the passenger transmitting a wireless push notification signal towards the autonomous vehicle. The wireless push notification signal may indicate a position and/or motion capability of the passenger, such that the autonomous vehicle can determine the position and/or motion of the passenger.

The near-field wireless network can be any of a variety of potentially applicable technologies. For example, the near-field wireless network can be used to form a network or part of a network. Where two components are co-located on a device, the near-field wireless network can include data conduit or plane. Depending upon implementation-specific or other considerations, the near-field wireless network can include wireless communication interfaces for communicating over wired or wireless communication channels. Depending upon implementation-specific or other considerations, the near-field wireless network is an ad-hoc wireless network established between the handheld device and the autonomous vehicle. The near-field wireless network can be established using applicable wireless communication protocols, including license-based protocols, such as 3G (e.g., CDMA), 4G (e.g., WiMAX, WiMax2), 5G, and non-license-based protocols, such as IEEE 802.11 (e.g., WiFi), IEEE 802.15.1 (e.g., Bluetooth), IEEE 802.15.4 (e.g., ZigBee), near field communication (NFC), and so on.

In some implementations, in addition to the signals provided by the handheld device or in the absence of it, the vehicle may recognize the passenger with computer vision. For instance, the vehicle may use face recognition or retina recognition techniques to identify the passenger directly. In another example, the vehicle further considers the height, body weight, and/or other body feature for recognition or for further confirmation.

In some implementations, the vehicle may wirelessly transmit a request for the passenger to make a bodily gesture to enhance recognition. For instance, while the vehicle determines that the passenger is nearby but is surrounded by a few other persons who may confound identification, the vehicle may send an electronic request to the smart device of the passenger for the passenger to turn the body, raise an arm, or make a handwave.

Upon recognition of the passenger 110, the autonomous vehicle 101 then sends a directed alert notification to the passenger. The directed alert notification preferably includes a directed acoustic signal. A directed acoustic signal can be generated, for instance, by two or more speakers (e.g., speaker 120 and 121 in FIG. 1A) placed at different locations of the autonomous vehicle, or more close together in the form of an array (e.g., a speaker array).

The directivity of a sound source relates to the size of the source (e.g., speaker). A large loudspeaker is naturally more directional because of its large size. A source with equivalent directivity, on the other hand, can be made by utilizing an array of traditional small loudspeakers, all driven together in-phase. Acoustically equal to a large speaker, this creates a larger source size compared to wavelength, and the resulting sound field is narrowed compared to a single small speaker. The multiple speakers can also be placed farther away.

As illustrated in FIG. 1A, at least two speakers 120 and 121 are installed on the front and rear ends of the vehicle. From the two or more speakers, the same sound signal can be output, but delayed slightly by different amounts, so that the wavefronts all reach the same target point at the same time. Such a virtual focus reduces sound pollution in surrounding areas.

The target point, in some implementations, is on or around the body of the passenger. In a preferred embodiment, the target point is at the head, or more precisely the ears of the passenger.

The directed alert notification, in some embodiments, can be presented in a manner that enhances interaction with the passenger. In one example, the directed alert notification gradually increases its volume until a suitable reaction (e.g., turn or walk towards the vehicle) by the passenger is identified.

In another example, the directed alert notification is generated such that, when received by the passenger, the passenger can readily tell the location of the vehicle. Humans and animals in general have the ability to tell the direction of a sound source. In addition, the sound can be provided with 3-dimensional effects such that the passenger can sense the movement direction and speed of the vehicle.

In another example, the directed alert notification includes an instruction. For instance, the instruction can be for the passenger to make a confirmation on a smart device, to approach the vehicle, or to open a door, without limitation.

In addition to the acoustic alert, the directed alert can also include, e.g., visible lights and heat waves. For instance, one method entails projecting a light spot on the ground in front of the passenger or a device that the passenger is holding or looking at. The light spot can be projected by an appropriate laser pointer, so that it is easily noticeable to the passenger, yet still safe to humans. In another example, heat can be delivered to a specific body part surface of the passenger. The heat can be delivered through specially designed disk heater which delivers heat in a specific direction.

It can be helpful to detect the passenger's posture or orientation to determine the optimal spot on the body or on the ground to achieve good result and avoid potential injuries (e.g. avoid projecting light directly into any passenger's eyes). With such information, the vehicle can also make determination with respect to the best mode of alert notification. For instance, if the passenger is looking at a screen of a smart device, the directed alert notification may include a directed acoustic signal along with an electronic message to be displayed on the smart device. Alternatively, the directed alert notification may include a directed acoustic signal along with laser point projected to the smart device.

In some implementations, different modes of alert notifications can be alternated if an identified passenger is non-responsive. The non-responsiveness may be because the identified passenger is actually not the passenger and did not expect to receive a ride. It may also be cause the identified passenger is deaf, blind, or distracted.

After certain attempts, if the identified passenger is still non-responsive, the vehicle can check whether it has identified the wrong person. Accordingly, the autonomous vehicle can reinitiate the passenger identification process, as elaborated above, and identify another person.

Once the passenger becomes responsive, the autonomous vehicle can then operate to continue the service, such as passenger authentication, opening the door, seating the passenger, providing riding instructions and/or entertainment, without limitation.

Figure 1B:
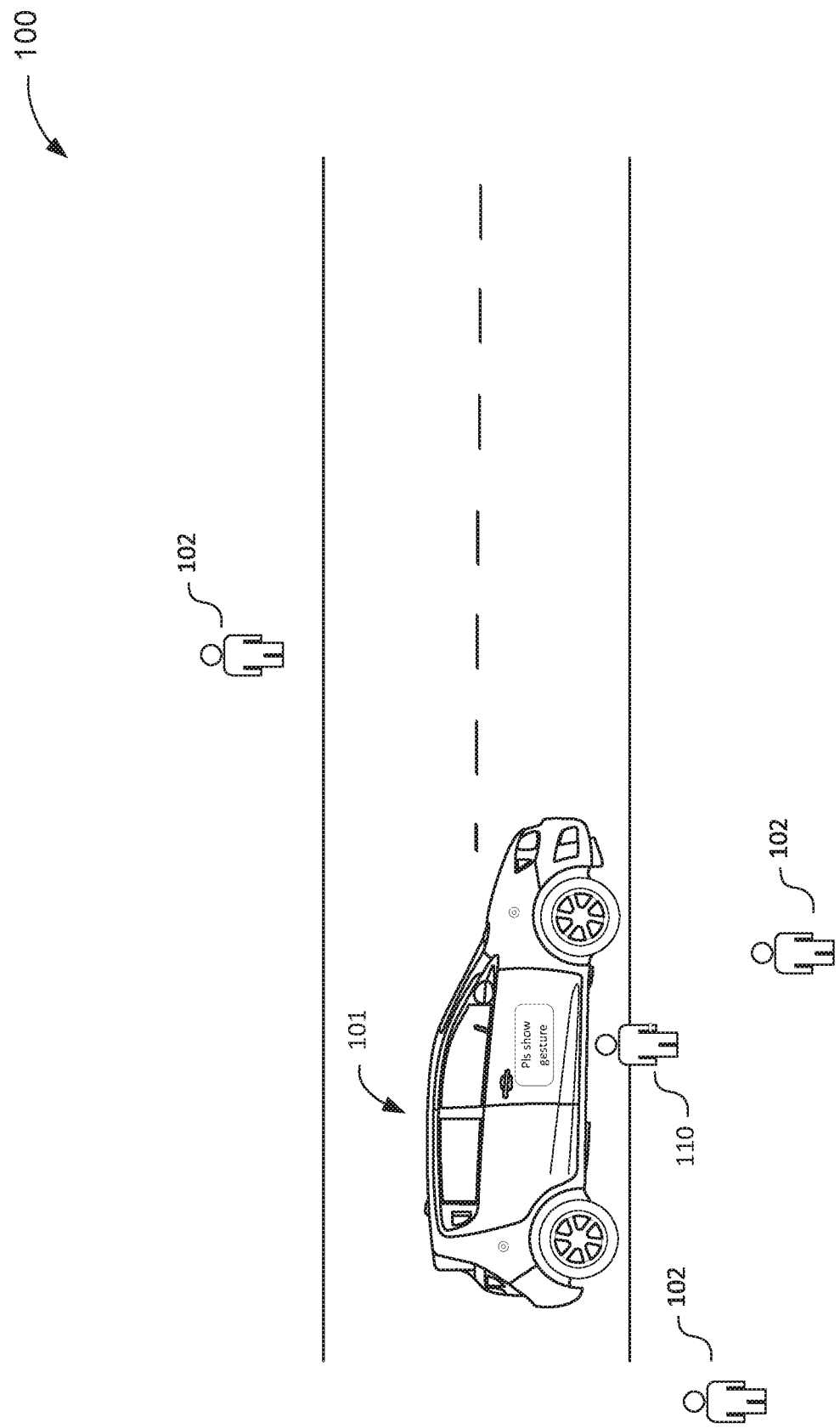

For instance, as illustrated in FIG. 1B, the identified passenger 110 is instructed by the directed alert notification to move closer to the front curb-side door of the vehicle. The passenger moves over, and then is able to see a display panel on the door (or window) of the autonomous vehicle, which instructs the passenger to "Pls show gesture." The passenger, prior to the arrival of the autonomous vehicle, had already received a message on the handheld device informing the passenger what gesture to make when prompted. Therefore, when the passenger sees the message displayed, the passenger can make the required gesture.

This interaction between the autonomous vehicle and the passenger is helpful because there is a possibility that the initial directed voice notification identifies the wrong person as the passenger. This additional interaction not only adds a level of authentication, but also further confirms the intention of the passenger to use the autonomous vehicle.

In some examples, the displayed message may be one that instructs the passenger to take on additional authentication measures. For instance, the passenger may be asked to look closer to an image sensor and allows authentication by checking the face or the iris, or the contour of a side of the body. In another example, the passenger is asked to speak to a microphone on the vehicle which may be transmitted back to the device that orders the arrival of the vehicle to authenticate the voice. In some examples, when the passengers moves according to the instruction, the vehicle can detect the location of the handheld device and confirm that the passenger and the handheld device are co-located, which is also a means of authentication.

In some embodiments, the display is equipped with an input device, such as a touch sensor, so that the passenger may be able to enter information as needed. For instance, as illustrated in FIG. 1C, the passenger may be asked to type in a pin number to open the door, which pin number can be provided to the passenger by other means. If the passenger has visual impairment, the autonomous vehicle may also be equipped with speakers and microphones to facilitate communication. The speakers for this purpose may be the same or part of the speakers for the directed notification. These speakers can also be separate from those for the directed notification and are closer to where the passenger is located. In some embodiments, the dedicated speaker uses a lower voice or directed sound such that people other than the passenger may not hear it.

In some implementations, the customer identified with the directed notification is a person that awaits a delivery by the autonomous vehicle. Similar authentication and instructions can be carried out as for passengers. For instance, the identified customer can be instructed by the directed alert notification to move closer to the front curb-side door of the vehicle. The customer moves over, and then is able to see a display panel on the door (or window) of the autonomous vehicle, which instructs the customer to engage in authentication. The authentication can be a gesture made by the customer, by facial, body contour, iris or voice recognition, without limitation.

In some examples, a message is displayed on the door or window of the vehicle that instructs the customer to take on additional authentication measures. For instance, the customer may be asked to look closer to an image sensor and allows authentication by checking the face or the iris. In another example, the customer is asked to speak to a microphone on the vehicle which may be transmitted back to the device that orders the arrival of the vehicle to authenticate the voice. In some examples, when the customers moves according to the instruction, the vehicle can detect the location of the handheld device and confirm that the customer and the handheld device are co-located, which is also a means of authentication.

In some embodiments, the display is equipped with an input device, such as a touch sensor, so that the customer may be able to enter information as needed. For instance, as illustrated in FIG. 1C, the customer may be asked to type in a pin number to open the door, which pin number can be provided to the customer by other means. If the customer has visual impairment, the autonomous vehicle may also be equipped with speakers and microphones to facilitate communication. The speakers for this purpose may be the same or part of the speakers for the directed notification. These speakers can also be separate from those for the directed notification and are closer to where the customer is located. In some embodiments, the dedicated speaker uses a lower voice or directed sound such that people other than the customer may not hear it.

The customer may be provided additional instruction for receiving the delivery. For instance, the screen may display instructions for opening the trunk, the door, or the window for inspecting and receiving the delivery, The screen may also show the listing of items, where each is located in the vehicle, and any special attention needed for handling each item.

The vehicle can include different types of sensors monitoring the items. The sensors may be image sensors, weight sensors, temperature sensors, or wireless signal transmitters or receivers. When a wrong item is picked up, a notification may be sounded or shown on the screen. While the items are picked up, the screen may display the update for the customer to check.

Upon completion of receiving the delivery, in some embodiments, the customer may signal confirmation of such completion. In one example, the customer presses a button to close the door or the window, or mechanically close it. In another example, the customer simply turns around and walks away, and if the customer does not turn back within a predetermined time, that is sufficient confirmation.

In the even that the customer signals completion of receiving the delivery but actually leaves one or more items in the vehicle, the vehicle can alert the customer. The alert can be made with one of the speakers, one of the displays, the handheld device of the customer, without limitation.

In some embodiments, prior to, during, or after the delivery, the vehicle rearranges the items to facilitate pickup yet saving storage space. For instance, prior to the pickup, the vehicle may keep the items according to their size, shape, storage temperature, and/or sensitivity to light in suitable locations and/or orientation. Shortly before or when the door or window is open, the vehicle can rearrange the items so that the customer can retrieve them easily. In some embodiments, the items may be already placed in a container such that the customer can pick them all up together. Once the delivery is completed, in some embodiments, the vehicle may rearrange the remaining items to save space, or to facilitate next delivery.

In a specific implementation, the system performs: receive a request to meet a person at a location; drive the vehicle to the location; identify the person at the location; and provide, e.g., on an display or through an audio device, an instruction for the person to interact with the vehicle. In some embodiments, prior to the interaction, the system sends a directed alert notification to the person, wherein the directed alert notification comprises a directed acoustic signal.

Figure 2:
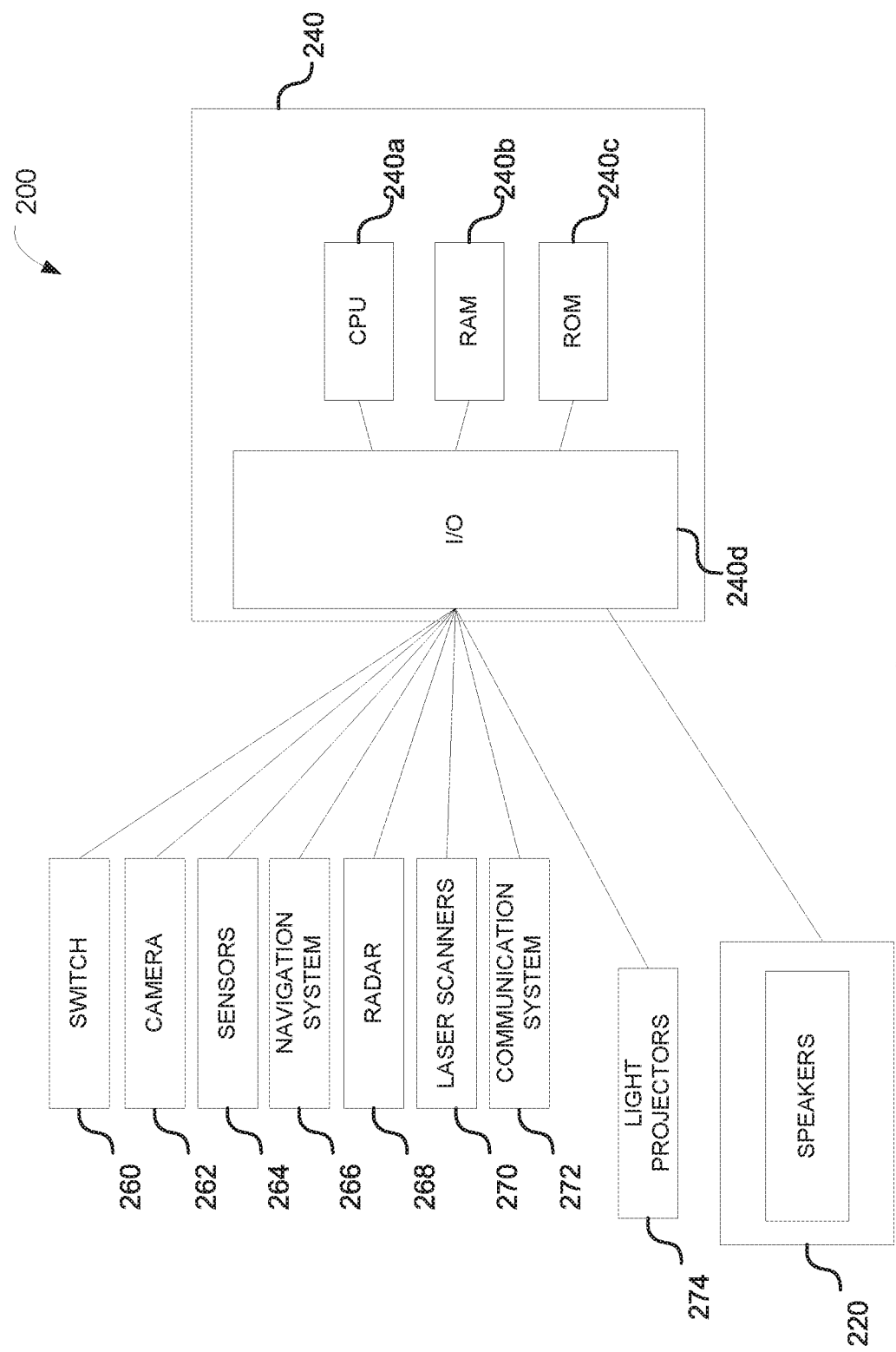
FIG. 2 is a schematic diagram depicting an example of an autonomous-driving vehicle system according to an embodiment.

FIG. 2 is a schematic representation of a system 200 of an autonomous vehicle in accordance with various embodiments of the disclosure. The system 200 may include a plurality of speakers 220 controlled by the autonomous vehicle's electronic control unit 240. In addition, a light projector 274 can be included to transmit light from a light source, such as a laser diode or light-emitting diodes ("LED"). The terms "optical" and "light" may be used herein to refer generally to any visible, infrared, or ultraviolet radiation. The light projector may transmit and project visual information in the form of images and patterns in a two-dimensional or three-dimensional rendering. The light projection may also project data and information, such as in the form of letters and numbers indicating real time information regarding the autonomous vehicle itself. More information about the content of the light projector's projected information is discussed in further detail below.

In some instances, the autonomous vehicle may include an electronic control unit ("ECU") 240. The ECU 240 may include a CPU 240a, a RAM 240b, a ROM 240c, and an I/O module 240d. The RAM 240b and ROM 240c may be used as, for example, memory storage devices to store data and instructions listing conditions and threshold requirements for turning on/off the speakers 220, as well as the acoustic content and information to be transmitted from the speakers 220. The ECU 240 may also be able to detect whether the speakers 200 are turned on or off. If off, the ECU 240 may then turn on the speakers 220. In some instances, the ECU 240 may turn on the speakers 220 via the switch 260 under certain conditions, such as when the ECU 240 detects the target subject (e.g., passenger) anywhere from 0 to 100 feet from the autonomous vehicle. By way of example, the detection by ECU 240 may utilize any one of the vehicle cameras 262, sensors 264, navigation systems 266, radars 268, laser scanners 270, and communication systems 272 in communication with the ECU 240.

Additionally, the CPU 240a may perform various computations from the data gathered by the vehicle cameras 262, sensors 264, navigation systems 266, radars 268, laser scanners 270, and communications systems 272. Such computations may include determining whether a subject detects is the target subject.

By way of example, detecting the target subject may entail analyzing the one or more data gathered by the vehicle cameras 262, sensors 264, navigation systems 266, radars 268, laser scanners 270, and communications systems 272. The I/O module 240d may be connected to various vehicle components, devices, and systems to detect certain environmental, road, and/or driving conditions. For example, the I/O module 240d may be connected to cameras 262, sensors 264, navigation systems 266, communication systems 268, radar 270, and laser scanners 272. These various vehicle components may be used individually or in combination with one another to detect the select environmental, road, and/or driving conditions in real time.

By way of example, cameras 262 may be mounted in the interior and/or exterior sections of the autonomous vehicle. In some embodiments, the cameras 262 may be a still camera and/or video camera that may capture images and videos of the front, sides, and rear surrounding areas of the vehicle. The cameras 262 may be oriented to take images and videos of preceding vehicles and oncoming vehicles, as well as pedestrians, objects, and road conditions surrounding the general vicinity of the vehicle.

In some instances, images captured by the cameras 262 may be processed with object recognition software to detect certain objects of interest. By way of example, the cameras 262 may capture images and/or videos of the surrounding vehicle environment, which may include potential pedestrians, road signs, oncoming vehicles, preceding vehicles, and the like. The images and/or videos may then be processed by the CPU 240a, where they may then filtered with an object recognition software.

To determine if any of the objects in the images and/or videos include the target subject, the object recognition software may include a datastore with reference materials. By way of example, the reference materials may also include information regarding shapes, pixel intensities, lines, and other information that can be used to help further identify the objects of interest in the images and/or videos. By detecting for certain objects surrounding the autonomous vehicle 200, the ECU 240 may be able to factor the presence of the identified objects and make the determination whether the autonomous vehicle's speakers should be used to transmit the appropriate alert notifications.

There may also be a plurality of sensors connected to the I/O module 240d, where the sensors 264 may be used to detect various environmental, road, or driving conditions. By way of example, such sensors 264 may detect distance between vehicles (e.g. radar sensors), speed of current autonomous vehicle travel (e.g. accelerometer and speedometer), object detection (e.g. radar sensors), motion detection (e.g., motion sensors), moisture detection (e.g., moisture detection sensors), steering handling detection (steering wheel sensors), and the like. The sensors alone or in combination with the camera 262, navigation system 266, radar 268, the laser scanners 270, and communication systems 272 may be used to collect data in real time, which may then be processed by the CPU 240a.

The navigation system 266 may also be connected to the I/O module 240d. The navigation system 266 may include a navigation processor, a navigation adjustment component, and a GPS component. In some embodiments, the navigation system 266 may determine the location of vehicle in real time and determine the current and upcoming road and traffic conditions using a GPS component (which may include or be a GPS receiver). In some embodiments, navigation system 266 may receive information from third party service providers, such as current traffic information, weather information, road construction information, and the like. While the navigation system 266 may provide quickest route or provide a route based on driver specifications (e.g., no toll road, no highways, no private roads, etc.), the autonomous vehicle may also utilize the camera 262, sensors 264, radar 268, laser scanners 270, and communication systems 272 to determine the suitable driving actions.

By way of further example, the communication system 272 may also be connected to the I/O module 240d. The communication system 272 may include telematic systems, such as on-board diagnostics (OBD) systems installed within autonomous vehicles, which may be configured to access vehicle computers and transmit vehicle data to the CPU 240a. In some instances, the communication system 268 may also include a Bluetooth system to enable communication between the vehicle and the driver's mobile phone. This may allow any data collected from a mobile device, such as location information, to be transmitted to the CPU 240a for data processing.

In the example depicted in FIG. 2, the system 200 can represent a system primarily mounted on an autonomous-driving vehicle, which is capable of sensing its environment and navigating with a limited human input or without human input. The "vehicle" discussed in this paper typically includes a vehicle that drives on the ground, such as wheeled vehicles, and may also include a vehicle that flies in the sky (e.g., drones, helicopter, airplanes, and so on). The "vehicle" discussed in this paper may or may not accommodate one or more passengers therein.

In one embodiment, the autonomous-driving vehicle includes a vehicle that controls braking and/or acceleration without real time human input. In another embodiment, the autonomous-driving vehicle includes a vehicle that controls steering without real time human input based on inputs from one or more lens mount units. In another embodiment, the autonomous-driving vehicle includes a vehicle that autonomously controls braking, acceleration, and steering without real time human input specifically for parking the vehicle at a specific parking space, such as a parking lot, a curb side of a road (e.g., parallel parking), and a home garage, and so on. Further, "real time human input" is intended to represent a human input that is needed to concurrently control movement of a non-autonomous-driving vehicle, such as gear shifting, steering control, braking pedal control, accel pedal control, crutch pedal control, and so on.

The autonomous-driving vehicle system is also capable of communicating with systems or devices connected to the autonomous-driving vehicle system through a network. In an embodiment, the autonomous-driving vehicle system communicates with a server via the network. For example, the autonomous-driving vehicle system pulls up from the server map information (e.g., local map, parking structure map, floor plan of buildings, and etc.) of a region around the autonomous-driving vehicle. In another example, the autonomous-driving vehicle system periodically notifies information of the autonomous-driving vehicle system such as locations and directions thereof to the server.

In some embodiments, the network is intended to represent a variety of potentially applicable technologies. For example, the network can be used to form a network or part of a larger network. Where two components are co-located on a device, the network can include a bus or other data conduit or plane. Depending upon implementation-specific or other considerations, the network can include wired communication interfaces and wireless communication interfaces for communicating over wired or wireless communication channels. Where a first component is located on a first device and a second component is located on a second (different) device, the network can include a wireless or wired back-end network or LAN. The network can also encompass a relevant portion of a WAN or other network, if applicable. Enterprise networks can include geographically distributed LANs coupled across WAN segments. For example, a distributed enterprise network can include multiple LANs (each LAN is sometimes referred to as a Basic Service Set (BSS) in IEEE 802.11 parlance, though no explicit requirement is suggested here) separated by WAN segments. An enterprise network can also use VLAN tunneling (the connected LANs are sometimes referred to as an Extended Service Set (ESS) in IEEE 802.11 parlance, though no explicit requirement is suggested here). Depending upon implementation or other considerations, the network can include a private cloud under the control of an enterprise or third party, or a public cloud.

Figure 3A:
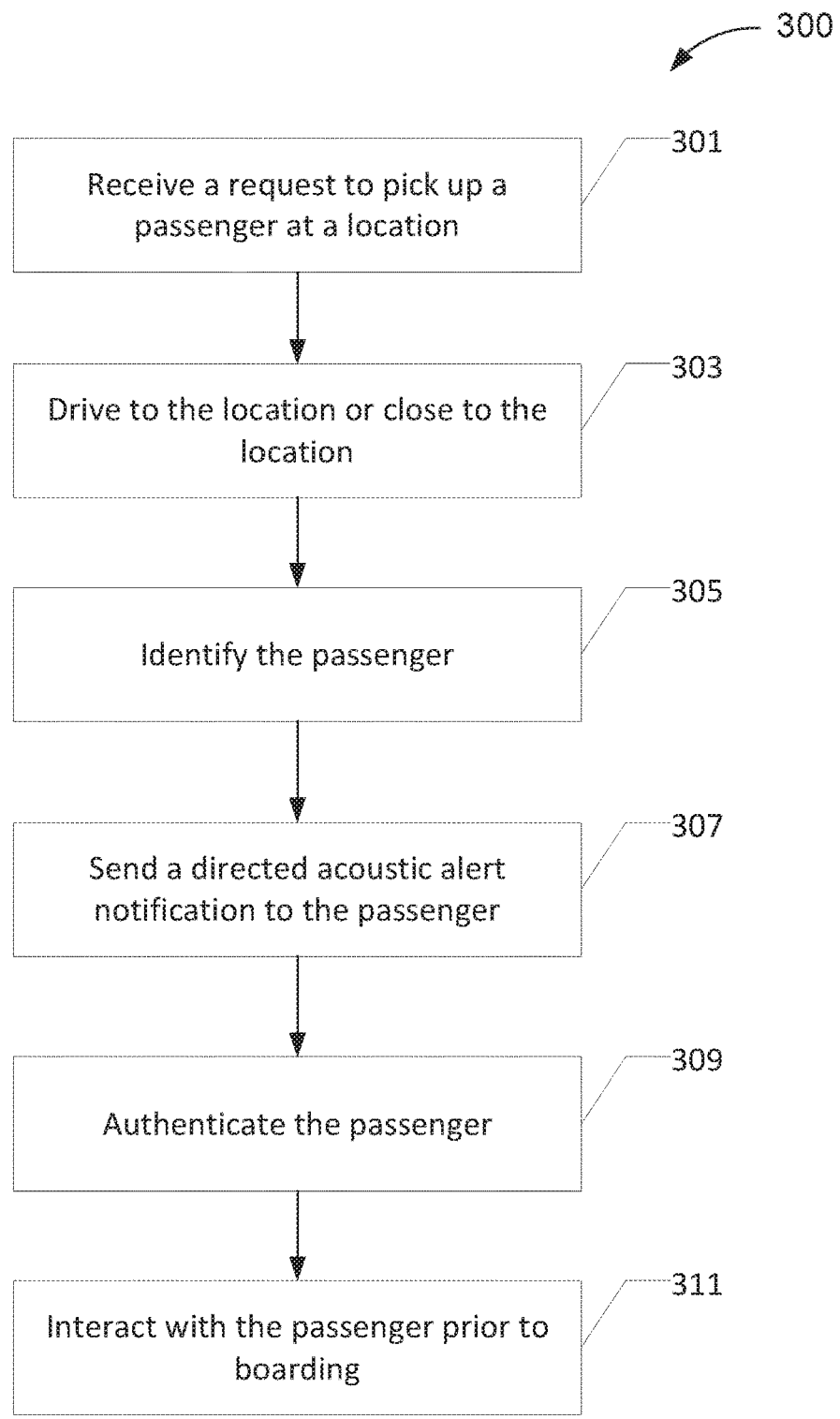
FIG. 3A-3B depict flowcharts of example methods for operating an autonomous-driving vehicle system.

FIG. 3A depicts a flowchart 300 of an example of a method for operating an autonomous-driving vehicle system. This flowchart and other flowcharts described in this paper illustrate steps or modules (and potentially decision points) organized in a fashion that is conducive to understanding. It should be recognized, however, that the steps and modules can be reorganized for parallel execution, reordered, modified (changed, removed, or augmented), where circumstances permit. In the example of FIG. 3A, the illustrated method starts with receiving a request to pick up a passenger at a designated location (301). The request can be received by a network module in the autonomous vehicle, from a handheld device accompanying a potential passenger who desires a ride. As readily appreciated in the art, the transmission of the request can be wireless, through one or more servers or routers.

When the request is made by the passenger, the request also includes, without limitation, a location of the desired pickup, destination, and/or certain identifying information of the passenger. The identifying information may include part or all of the name (e.g., full name, first name, nick name), gender, body weight, height, or other information that the passenger considers useful for identifying himself or herself, and is willing to share with the vehicle. In some implementations, a picture of the passenger can also be provided along with the request. In some implementations, certain identifying information of the passenger's irises and/or retinas can also be provided along with the request, which will be useful for passenger identification or authentication.

In some implementations, the request is further supplemented with a payment or an authorization for payment upon a successful pick up and ride. In some implementations, some or all of the information is first received at a server, and all or part of that information is then transmitted to the vehicle upon selection of the vehicle.

In some implementations, at least some of the identifying information is collected but is only kept at the handheld device for protection of privacy. When identification is required (as described below), the vehicle collects certain information from a potential passenger and then such collected information is compared to the information stored in the handheld device for verification.

Upon receipt of the request, the autonomous vehicle drives to the designated location. While driving, in some implementations, the vehicles may send occasional updates to the passenger's device with respects to its own location. Meanwhile, the vehicle may receive updates from the passenger's device with respect to any of the information provided initially, including location and passenger identifying information.

When the vehicle is close to or at the location, the vehicle starts to detect the passenger. In some implementations, the passenger sees that vehicle (e.g., by checking the license plate or make of the vehicle) and can signal confirmation by, e.g., notifying the vehicle via the handheld device or showing a gesture. For security purposes, the gesture may be one specifically requested by the vehicle so that other people may not know.

In some implementations, the passenger is unaware that the vehicle is approaching. This might be because the passenger is not paying attention to the updates on the handheld device, is distracted or not paying attention, or has impaired vision or is imply blind. In these instances, the autonomous vehicle has to detect the passenger (305). One piece of information that the vehicle can use is the location of the handheld device.

In some implementations, in particular when the GPS signals are strong or when the passenger is not surrounded by other persons, a detection of the only person within an area that likely matches the received GPS location of the handheld device can be considered the right passenger.

In situations where the GPS location is insufficient to distinguish a potential passenger from surrounding persons, additional information may be needed. In some implementations, the handheld device, upon request from the vehicle, transmits a near field wireless push notification signal towards the autonomous vehicle. The signals may be a Bluetooth signal, a near field communication (NFC) signal, an infrared signal, a WiFi signal, or the like.

In some implementations, the vehicle detects the passenger with computer vision. For instance, the vehicle is equipped one or more still and/or video cameras. The cameras may acquire video or images of a potential passenger and the compares the acquired image or video with those stored. The stored image or video may be stored at a server, at the vehicle, or at the device that made the initial request for the vehicle. In the event the stored image or video is not saved on the vehicle, the vehicle extracts certain parameters from the acquired images or videos to be uploaded to the server or sent back to the device to reduce data transmission burden and to protect privacy.

In some instances, the passenger detected is determined not to be the correct passenger. The vehicle then continues to look for the correct passenger. Some or all of the above identification steps may be run again, until the correct passenger is identified.

Upon identification of the passenger, the vehicle can then send a directed alert notification to the passenger (307). The directed alert notification preferably includes an acoustic element. As illustrated in FIG. 1A, the acoustic alert can be generated with two or more speakers arranged as an array or distant from each other at different locations of the vehicle. The acoustic signal is directed such that preferably only the passenger can hear it. Persons around the passenger may not hear it or can only hear it at a much reduced volume.

In some implementations, the speakers are placed on the vehicle as far as possible. For instance, at least one of the speakers is at the front end of the vehicle, e.g., before the front wheels. In some implementations, at least one of the speakers is at the rear end of the vehicle (e.g., above or behind the rear wheels). In some implementations, the vehicle at least includes an array of speakers. From the two or more speakers, the same sound signal can be output, but delayed slightly by different amounts, so that the wavefronts all reach the same target point at the same time. Such a virtual focus reduces sound pollution in surrounding areas.

In general, the directed alert notification is directed at a target point close to or within the body contour of the passenger. In a preferred embodiment, the target point is at the head, or more precisely the ears of the passenger.

In another example, the directed alert notification is generated such that, when received by the passenger, the passenger can readily tell the location of the vehicle. The sound can be provided with 3-dimensional effects such that the passenger can sense the movement direction and speed of the vehicle.

The directed alert notification, in some embodiments, can be presented in a manner that enhances interaction with the passenger. In one example, the directed alert notification gradually increases its volume until a suitable reaction by the passenger is identified. In another example, the directed alert notification includes an instruction. For instance, the instruction can be for the passenger to make a confirmation on a smart device, to approach the vehicle, or to open a door, without limitation.

In some implementations, the notification or any other communication is personalized to the passenger. For instance, the passenger, prior to the notification, has already received a wireless alert about a secret phrase, e.g., "Mary had a little lamb." Therefore, when the passenger hears/sees the phrase "Mary had a little lamb" from a sound/visual source nearby, the passenger understands that that is the vehicle they are expecting.

Personalization can also be based on the passenger's preference or profile, or even requirement. For instance, the vehicle may be able to determine that the passenger prefers or can only understand German. Therefore, the notification can be given in German.

In addition to the acoustic alert, the directed alert can also include, e.g., visible lights and heat waves. The visible light, for instance, can be projected by a laser pointer, so that it is easily noticeable to the passenger. In another example, heat can be delivered to a specific body part surface of the passenger.

In some implementations, the vehicle further detects the passenger's posture or orientation to determine the optimal spot on the body or on the ground to achieve good result and avoid potential injuries. With such information, the vehicle can also make determination with respect to the best mode of alert notification. For instance, if the passenger is looking at a screen of a smart device, the directed alert notification may include a directed acoustic signal along with an electronic message to be displayed on the smart device. Alternatively, the directed alert notification may include a directed acoustic signal along with laser point projected to the smart device.

The passenger, once identified and then notified, is expected to ride the vehicle. In some embodiments, however, prior to boarding the vehicle, confirmation and/or authentication is carried out (309). The confirmation, in some embodiments, can be simply done by a gesture (e.g., handwaving), or walking towards the vehicle. Authentication, on the other hand, can be done with the handheld device or with a passcode provided by the vehicle wirelessly.

In some embodiments, the vehicle provides a request for such authentication. The request may be in the form of asking to show a gesture. The gesture, if displayed on the screen or specified in an audio command, can confirm the intention of the passenger. If the type of the gesture is given to the passenger wirelessly to the handheld device, then it is also useful for authentication.

In some embodiments, the authentication is done by checking a portion of the body of the person in front of a sensor. The portion may be a face, an eye, or a side of the body. In some embodiments, the request may be for speaking or typing a code provided to the person wirelessly. Another authentication method entails confirming co-location of the person and a handheld device in wireless communication with the vehicle.

The vehicle can also interact with the passenger for other purposes (311). For instance, the vehicle may display the complete or partial information of the destination, the estimated arrival time, or the weather of the destination. In some embodiments, the vehicle may allow the passenger to view what can be seen by interior cameras to ensure that the interior is clean or there is no other people in the vehicle.

Figure 3B:
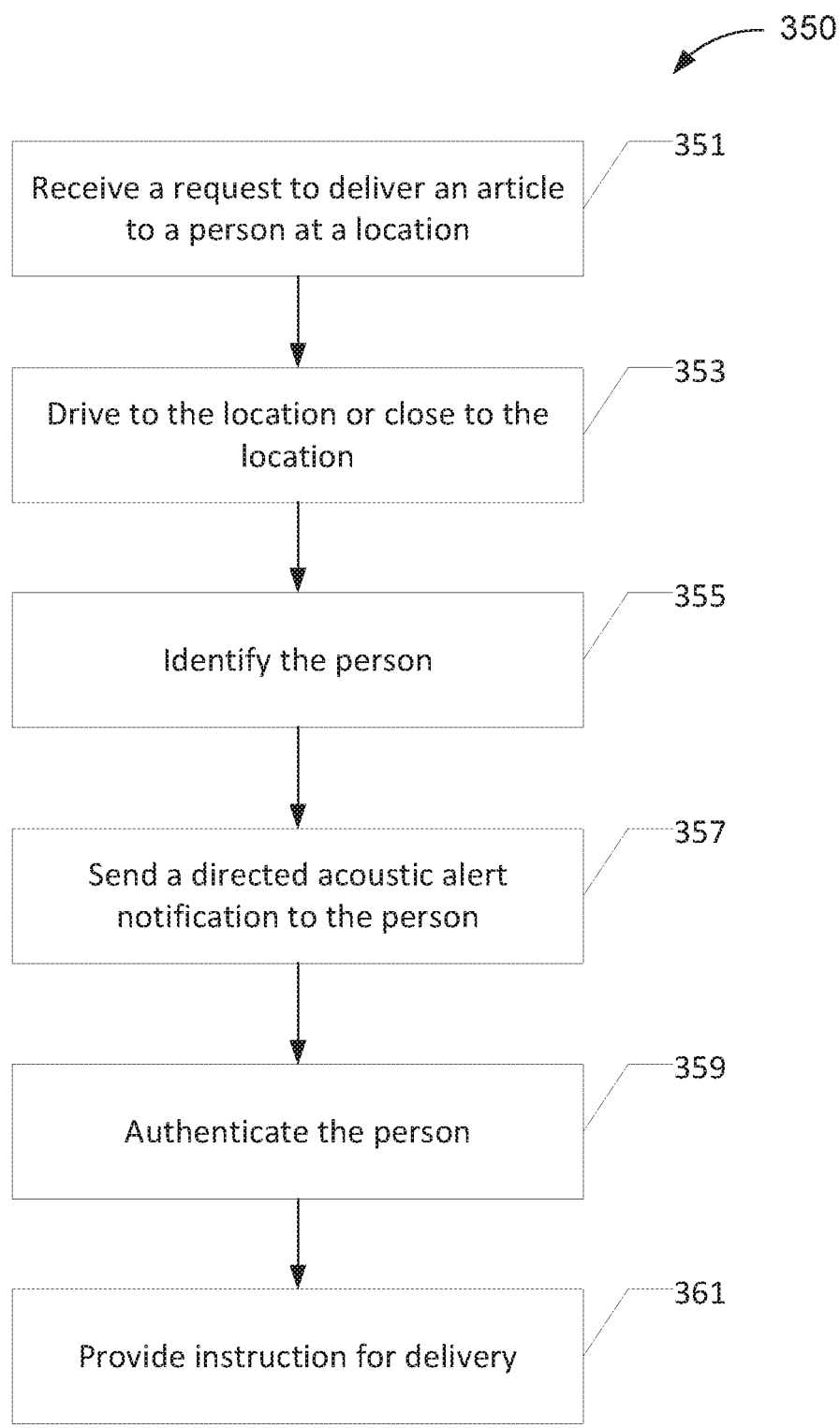

Upon notification and confirmation, the passenger boards the vehicle which can then take the passenger to the destination. As noted above, the present technology has other applications. For instance, as illustrated in FIG. 3B, the autonomous vehicle receives a request to deliver an article (e.g., purchased goods, packages) at a designated location. The vehicle then drives to the location (353). A person is expected at the location to receive the article. As in FIG. 3A, the vehicle also has received certain information about the person or a handheld device accompanying the person.

The vehicle arrives at the location and, through a variety of different means to identify the person expecting the delivery (355). Upon identification, the vehicle sends to the person a directed alert notification (357) and then authenticates the person (359) before instructing the person to pick up the items (361).

Prior, during or after the pickup, the vehicle may monitor the items in the vehicle. Not only can this ensure no theft during the pickup, it also facilitates and ensures correct and complete pickup. For instance, the system may rearrange items to facilitate the pickup. After the pickup, the vehicle can then rearrange the remaining items.

In some embodiments, once the pickup is completed, the system can receive a confirmation from the person that the pickup is complete.

The foregoing description of the present invention has been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows 10, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 4:
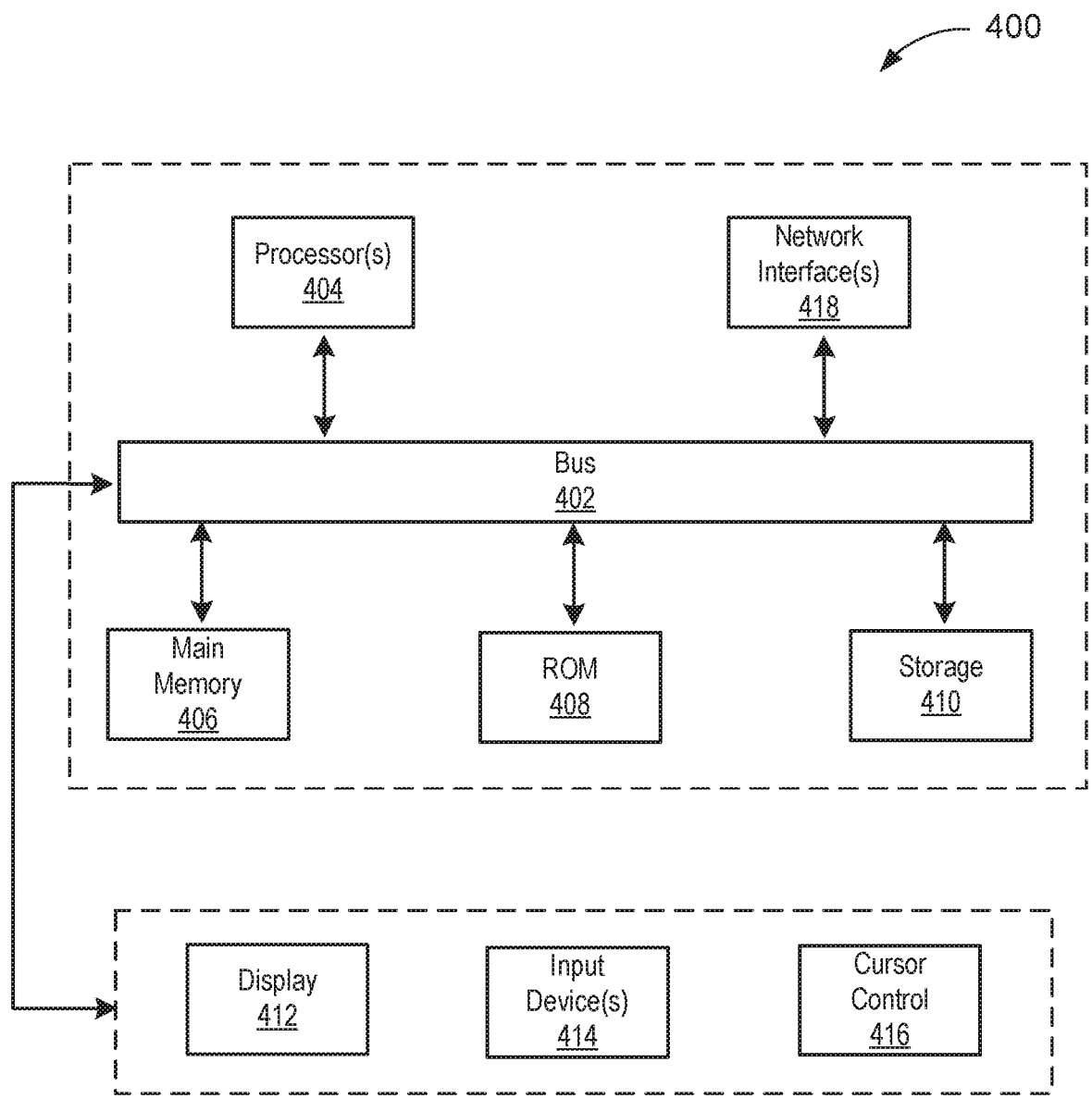
FIG. 4 is a block diagram that illustrates a computer system upon which any of the embodiments described herein may be implemented.

FIG. 4 is a block diagram that illustrates a computer system 400 upon which any of the embodiments described herein may be implemented. The computer system 400 includes a bus 402 or other communication mechanism for communicating information, one or more hardware processors 404 coupled with bus 402 for processing information. Hardware processor(s) 404 may be, for example, one or more general purpose microprocessors.

The computer system 400 also includes a main memory 406, such as a random access memory (RAM), cache and/or other dynamic storage devices, coupled to bus 402 for storing information and instructions to be executed by processor 404. Main memory 406 also may be used for storing temporary variables or other intermediate information during execution of instructions to be executed by processor 404. Such instructions, when stored in storage media accessible to processor 404, render computer system 400 into a special-purpose machine that is customized to perform the operations specified in the instructions.

The computer system 400 further includes a read only memory (ROM) 408 or other static storage device coupled to bus 402 for storing static information and instructions for processor 404. A storage device 410, such as a magnetic disk, optical disk, or USB thumb drive (Flash drive), etc., is provided and coupled to bus 402 for storing information and instructions.

The computer system 400 may be coupled via bus 402 to output device(s) 412, such as a cathode ray tube (CRT) or LCD display (or touch screen), for displaying information to a computer user. Input device(s) 414, including alphanumeric and other keys, are coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 400 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor(s) 404 executing one or more sequences of one or more instructions contained in main memory 406. Such instructions may be read into main memory 406 from another storage medium, such as storage device 410. Execution of the sequences of instructions contained in main memory 406 causes processor(s) 404 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 410. Volatile media includes dynamic memory, such as main memory 406. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may retrieves and executes the instructions. The instructions received by main memory 406 may optionally be stored on storage device 410 either before or after execution by processor 404.

The computer system 400 also includes a communication interface 418 coupled to bus 402. Communication interface 418 provides a two-way data communication coupling to one or more network links that are connected to one or more local networks. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN (or WAN component to communicated with a WAN). Wireless links may also be implemented. In any such implementation, communication interface 418 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 418, which carry the digital data to and from computer system 400, are example forms of transmission media.

The computer system 400 can send messages and receive data, including program code, through the network(s), network link and communication interface 418. In the Internet example, a server might transmit a requested code for an application program through the Internet, the ISP, the local network and the communication interface 418.

The received code may be executed by processor 404 as it is received, and/or stored in storage device 410, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A system for an autonomous-driving vehicle, comprising:
   one or more processors; and
   memory storing instructions that, when executed by the one or more processors, cause the one or more processors to:
   receive a request, from a device associated with a person, to meet the person at a location, the request further comprising a notification to deliver items;
   drive the vehicle to the location;

identify the person at the location, the identification including:
- determining, based on a density of people at the location, whether to request a signal from the device to confirm a proper identity of the person;
- in response to determining to request the signal from the device, receiving and authenticating the signal;

detect a posture or orientation of the person;
based on the detected posture or orientation, determine a mode of communication and a location at which to signal the person to interact with the vehicle;
assembling the items according to sizes, shapes, storage temperatures, and sensitivities to light;
detect an opening of a door; and
upon detecting an opening of the door, rearrange the items to reduce an amount of space consumed by the items.

2. The system of claim 1, wherein the signal comprises an authentication request for the person.

3. The system of claim 2, wherein the authentication request comprises a showing of a gesture.

4. The system of claim 2, wherein the authentication request comprises presenting a portion of the body of the person in front of a sensor.

5. The system of claim 4, wherein the portion comprises a face, an eye, or a side of the body.

6. The system of claim 1, wherein the instructions further cause the one or more processors to authenticate the person by confirming co-location of the person and a handheld device in wireless communication with the vehicle.

7. The system of claim 1, wherein the instructions further cause the one or more processors to provide an indication for the person to pick up an item in the vehicle.

8. The system of claim 7, wherein the instructions further cause the one or more processors to monitor items in the vehicle during the pickup.

9. The system of claim 8, wherein the instructions further cause the one or more processors to rearrange items to facilitate pickup.

10. The system of claim 1, wherein the instructions further cause the processor to, following identification of the person, send a directed alert notification to the person, wherein the directed alert notification comprises a directed acoustic signal.

11. The system of claim 10, wherein the directed acoustic signal is sent from at least two different sound generating devices disposed on the vehicle.

12. The system of claim 11, wherein the acoustic signal from each sound generating device is synchronized so as to arrive at the person at the same time.

13. The system of claim 10, wherein the directed alert notification includes a personalization based on a code provided to the person wirelessly in advance, or based on a user preference or language choice of the person.

14. A computer-implemented method performed in an autonomous-driving vehicle comprising:
receiving a request, from a device associated with a person, to meet the person at a location the request further comprising a notification to deliver items;
driving the vehicle to the location;
identifying the person at the location, the identification including:
- determining, based on a density of people at the location, whether to request a signal from the device to confirm a proper identity of the person;
- in response to determining to request the signal from the device, receiving and authenticating the signal;

detecting a posture or orientation of the person; and
based on the detected posture or orientation, determining a mode of communication and a location at which to signal the person to interact with the vehicle;
assembling the items according to sizes, shapes, storage temperatures, and sensitivities to light;
detecting an opening of a door; and
upon detecting an opening of the door, rearranging the items to reduce an amount of space consumed by the items.

15. The system of claim 1, wherein the mode of communication includes a series of acoustic signals, each of the acoustic signals originating from different speakers of the vehicle and having a different amount of delay such that the acoustic signals arrive at the location simultaneously; and the instructions further cause the processors to:
switch on the different speakers in response to the vehicle being within a threshold distance from the person.

16. The system of claim 1, wherein the instructions further cause the processors to:
Select a particular speaker to communicate with the person based on a distance between the person and the vehicle and a privacy level of a communication with the person.

17. The system of claim 1, wherein the identification of the person is based on shapes and pixel intensities of potential persons of interest.

18. The system of claim 1, wherein the instructions further cause the processors to:
determine whether some or all of the items have been picked up by the person but one of the items are remaining in the vehicle; and
in response to determine that one of the items are remaining in the vehicle, issue an alert.

19. The system of claim 1, wherein the instructions further cause the processors to:
signal to pedestrians whether to proceed to cross a street at an intersection or whether the vehicle has priority.

* * * * *